(12) United States Patent
Wang et al.

(10) Patent No.: US 11,175,206 B2
(45) Date of Patent: Nov. 16, 2021

(54) TUBE PURE SHEAR LOADING DEVICE AND METHOD

(71) Applicants: Harbin Institute of Technology, Heilongjiang (CN); Benxi Golden Sun Laser Repairment Technology Co., Ltd., Benxi (CN)

(72) Inventors: Xiaosong Wang, Heilongjiang (CN); Weilong Hu, Heilongjiang (CN); Shijian Yuan, Heilongjiang (CN)

(\*) Notice: Subject to any disclaimer, the term of this patent is extended or adjusted under 35 U.S.C. 154(b) by 236 days.

(21) Appl. No.: 16/704,546

(22) Filed: Dec. 5, 2019

(65) Prior Publication Data
US 2020/0182763 A1    Jun. 11, 2020

(30) Foreign Application Priority Data
Dec. 6, 2018   (CN) .......................... 201811486419.7

(51) Int. Cl.
*G01N 3/24* (2006.01)
*G01N 3/02* (2006.01)
*G01N 3/04* (2006.01)

(52) U.S. Cl.
CPC ................ *G01N 3/24* (2013.01); *G01N 3/02* (2013.01); *G01N 3/04* (2013.01); *G01N 2203/0025* (2013.01); *G01N 2203/0266* (2013.01); *G01N 2203/0641* (2013.01)

(58) Field of Classification Search
CPC .. G01N 3/24; G01N 3/02; G01N 3/04; G01N 2203/0025; G01N 2203/0641; G01N 2203/0266
See application file for complete search history.

(56) References Cited

U.S. PATENT DOCUMENTS

| | | | | |
|---|---|---|---|---|
| 7,770,467 | B1 \* | 8/2010 | Halderman | G01N 3/04 73/856 |
| 8,006,568 | B2 \* | 8/2011 | Halderman | G01N 3/04 73/856 |
| 8,347,730 | B2 \* | 1/2013 | Lorenz | G01N 3/04 73/856 |
| 2010/0000329 | A1 \* | 1/2010 | Lorenz | G01N 3/04 73/856 |

\* cited by examiner

*Primary Examiner* — Jonathan M Dunlap
(74) *Attorney, Agent, or Firm* — Egbert, McDaniel & Swartz, PLLC

(57) ABSTRACT

Disclosed are a tube pure shear loading device and method. A first mandrel penetrates into a first half tube, and a second mandrel penetrates into a second half tube. The size of the first mandrel matches the size of the first half tube, and the size of the second mandrel matches the size of the second half tube. A first connecting portion of the first mandrel and a second connecting portion of the second mandrel are loaded, and a first protruding portion and a second protruding portion transmit a force to a to-be-tested tube, so that a material of a whole tube in the same plane as a right plane or a left plane of the first half tube and a left plane or a right plane of the second half tube is in a pure shear stress state.

20 Claims, 3 Drawing Sheets

TUBE PURE SHEAR LOADING DEVICE AND METHOD

CROSS-REFERENCE TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention relates to the technical field of tube mechanical property testing, and in particular, to a tube pure shear loading device and method.

2. Description of Related Art Including Information Disclosed Under 37 CFR 1.97 and 37 CFR 1.98

Tubes have a wide range of applications in national economic production, and have circular, square and special-shaped sections. In addition to being directly used as load-bearing members, tubular parts are often used as structural members after plastic processing. Typical forming methods of tubes include internal high-pressure forming and bending forming, etc. Representative parts include structural members of automobile bodies and chassis, various bending axis lines in aircrafts and automobiles, etc.

In order to avoid failure phenomena such as wrinkling and cracking of the tubes during plastic processing, it is necessary to understand the mechanical properties of the tubes used, rationally design and optimize forming process parameters by means of computer numerical simulation results, and effectively shorten the development process of parts and reduce the cost of parts research and development. Therefore, obtaining accurate mechanical property test data of tubes is an urgent problem in practical engineering applications.

Since uniaxial tensile test is simple and easy to carry out, it is currently the most important method for obtaining material properties. Shear deformation is one of the main ways of material deformation. From the 1950's to the present, the academic circle has been studying pure shear loading tests to obtain the shear properties of sheets. Although a variety of sheet shear tests have been proposed, and specially-designed loading patterns and loading methods are used to produce a pure shear stress state in a certain area of the sheet, the existing methods cannot keep the pure shear stress state of the tested material throughout the deformation process.

Taking the American Society for Testing and Materials standard ASTM B831-05, 2005 for aluminum alloy sheet styles as an example, the method processes two long grooves under a sheet, and when a tensile force is applied to the sheet, a material between the two long grooves is a shear loading area. However, there will be an additional tensile stress in the deformed area as the deformation progresses, that is, the material of the area cannot be guaranteed to be in a pure shear stress state during the whole process of loading. This is the common problem of present sheet shear test methods.

Theoretically, a tube torsion test can be used to obtain the shear test characteristics of tubes. However, since the torsion loading is extremely unstable for thin-walled tubes, it is impossible to obtain effective test data, and cannot be practically used. Although tubes with a large wall thickness are not likely to be unstable, the torsion test is not suitable because of a difficulty in loading.

Therefore, there is currently no effective method for the pure shear test of tubes, which is a problem of great concern and urgent to be solved in the academic and engineering circles.

It can be known from the material mechanics that if a tube is divided into upper and lower parts by a section passing through a tube axis, a pair of parallel forces in opposite directions are applied to the upper and lower parts, as shown in FIG. 1. At this time, a material of the section of the whole tube passing through the tube axis is in a pure shear stress state. However, after a plastic deformation occurs, the tube will be twisted due to a bending moment, and then, the stress state of the material of the section of the whole tube passing through the tube axis is no longer pure shear loading. Therefore, test data obtained by the test method is of no practical significance.

BRIEF SUMMARY OF THE INVENTION

An objective of the present invention is to provide a tube pure shear loading device and method, to solve the above problems in the prior art, so that a tube test piece is always in a stable pure shear loading stress state during an entire plastic deformation process, thereby obtaining reliable and complete material shear test data.

To achieve the above purpose, the present invention provides the following technical solutions:

The present invention provides a tube pure shear loading device, including a to-be-tested tube, where the to-be-tested tube includes a first half tube, a whole tube and a second half tube connected in order; the first half tube is provided therein with a first mandrel, and the second half tube is provided therein with a second mandrel; a right plane or a left plane of the first half tube is in the same plane as a left plane or a right plane of the second half tube, and is in the same plane as a tube axis of the whole tube; a section of the first half tube perpendicular to the tube axis of the whole tube and a section of the second half tube perpendicular to the tube axis of the whole tube are both equal to half a section of the whole tube perpendicular to the tube axis of the whole tube.

Preferably, the first mandrel includes a first connecting portion and a first protruding portion connected to each other; the first connecting portion is provided thereon with a first through hole; the first through hole is perpendicular to the right plane or the left plane of the first half tube; the first connecting portion is disposed in the first half tube; the first through hole is located outside the first half tube; the first protruding portion is engaged with the whole tube, for fixing the first mandrel; the second mandrel includes a second connecting portion and a second protruding portion connected to each other; the second connecting portion is provided thereon with a second through hole; the second through hole is perpendicular to the left plane or the right plane of the second half tube; the second connecting portion is disposed in the second half tube; the second through hole is located outside the second half tube; the second protruding portion is engaged with the whole tube, for fixing the second mandrel.

Preferably, an upper end of the first mandrel is connected to a first force transmitting portion, and the first force transmitting portion includes a first loading portion and a third connecting portion connected to each other; the third connecting portion is provided thereon with a third through hole; the third through hole and the first through hole are fixedly connected by a positioning pin; the first loading portion is provided thereon with a fourth through hole; the fourth through hole is configured to connect a testing machine; the upper end of the first mandrel is connected to a second force transmitting portion; the second force transmitting portion includes a second loading portion and a fourth connecting portion connected to each other; the fourth connecting portion is provided thereon with a fifth through hole; the fifth through hole and the second through hole are fixedly connected by the positioning pin; the second loading portion is provided thereon with a sixth through hole; the sixth through hole is configured to connect the testing machine.

Preferably, the sectional size of the first connecting portion matches the section of the first half tube, and the sectional size of the second connecting portion matches the section of the second half tube.

Preferably, the sectional size of the first connecting portion is the same as the sectional size of the third connecting portion, and the sectional size of the second connecting portion is the same as the sectional size of the fourth connecting portion.

Preferably, a junction of the first half tube and the whole tube and a junction of the second half tube and the whole tube are both provided with a slit, and the slits have the same size.

Preferably, a section of the to-be-tested tube perpendicular to the tube axis of the to-be-tested tube is circular, rectangular or special-shaped.

The present invention further provides a tube pure shear loading method, including: before measurement, spraying a speckle or applying a strain gage to an outer surface of a pure shear area on a whole tube, and penetrating a first mandrel into a first half tube, and a second mandrel into a second half tube; when a test is performed, connecting a tensile head of a material testing machine to the first mandrel or the second mandrel, or connecting the tensile head of the material testing machine to a first force transmitting portion and a second force transmitting portion, to apply a tensile force in opposite directions; and during the test, measuring strain by an optical measurement method in real time, or measuring the strain by collecting data of the strain gage, to obtain a shear stress-shear strain curve of the to-be-tested tube.

Preferably, during the test, pure shear loading of the tube is performed at a certain temperature, to measure the shear strength of the to-be-tested tube at a certain temperature.

Compared with the prior art, the present invention achieves the following technical effects.

In the present invention, a first half tube is provided therein with a first mandrel and a second half tube is provided therein with a second mandrel, so that a to-be-tested tube can only move in an axial direction, and the to-be-tested tube is limited to rotate; forces are applied to the first mandrel and the second mandrel in opposite directions; the first mandrel transmits a force to the first half tube, and the second mandrel transmits a force opposite to the force of the first mandrel to the second half tube, that is, the forces applied to the first mandrel and the second mandrel are converted into a shear force, and the first half tube and the second half tube are subjected to the forces that are parallel and in opposite directions; a material of a whole tube in the same plane as a right plane or a left plane of the first half tube and a left plane or a right plane of the second half tube is in a pure shear stress state, and a shear characteristic of the material in the axial direction can be obtained.

BRIEF DESCRIPTION OF THE SEVERAL VIEWS OF THE DRAWINGS

To describe the technical solutions in the embodiments of the present invention or in the prior art more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

Where: 1. first half tube, 2. whole tube, 3. second half tube, 4. first mandrel, 5. second mandrel, 6. first connecting portion, 7. first protruding portion, 8. first through hole, 9. first force transmitting portion, 10. second force transmitting portion, 11. first loading portion, 12. third connecting portion, 13. third through hole, 14. fourth through hole, and 15. positioning pin.

DETAILED DESCRIPTION OF THE INVENTION

The following clearly and completely describes the technical solutions in the embodiments of the present invention with reference to accompanying drawings in the embodiments of the present invention. Apparently, the described embodiments are merely a part rather than all of the embodiments of the present invention. All other embodiments obtained by a person of ordinary skill in the art based on the embodiments of the disclosure without creative efforts shall fall within the protection scope of the disclosure.

An objective of the present invention is to provide a tube pure shear loading device and method, to solve the above problems in the prior art, so that a tube test piece is always in a stable pure shear loading stress state during an entire elastic-plastic deformation process, thereby obtaining reliable and complete material shear test data.

In order to make the above objects, features, and advantages of the present invention more apparent, the present invention will be further described in detail in connection with the accompanying drawings and the detailed description.

Embodiment 1

Figure 1:
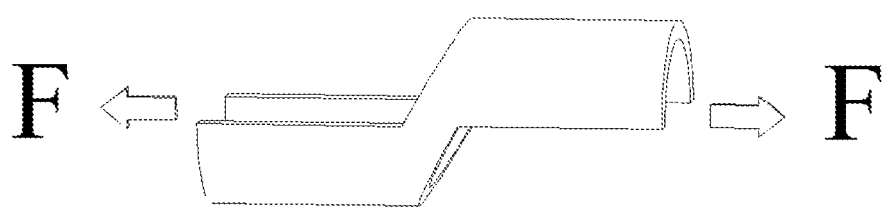
FIG. 1 is a conventional tube pure shear loading method.
Figure 2:
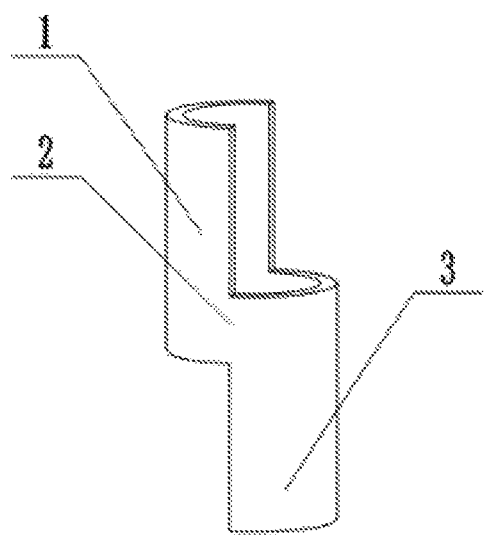
FIG. 2 is a schematic diagram of a to-be-tested tube according to the present invention.
Figure 3:
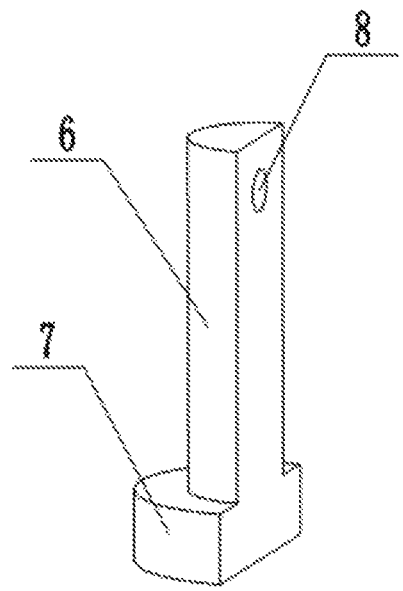
FIG. 3 is a schematic diagram of a first mandrel according to the present invention.
Figure 4:
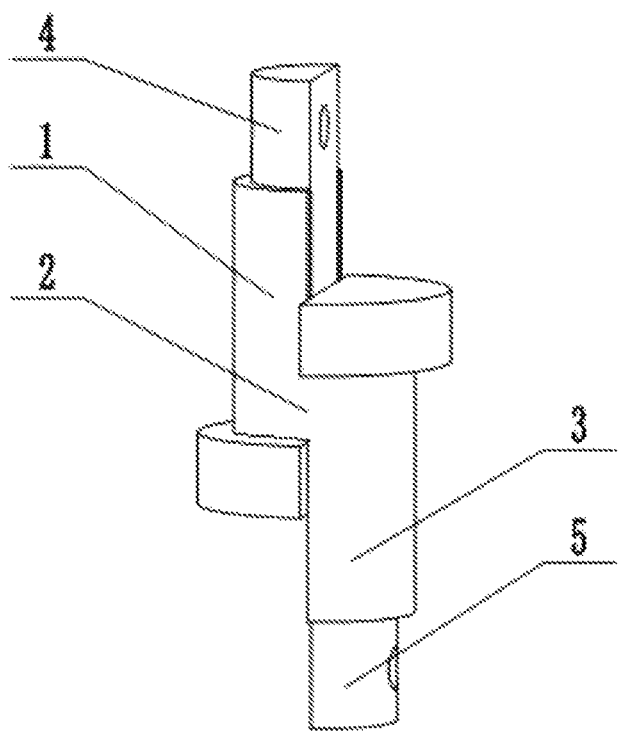
FIG. 4 is a first schematic diagram of a tube pure shear loading device according to the present invention.
Figure 5:
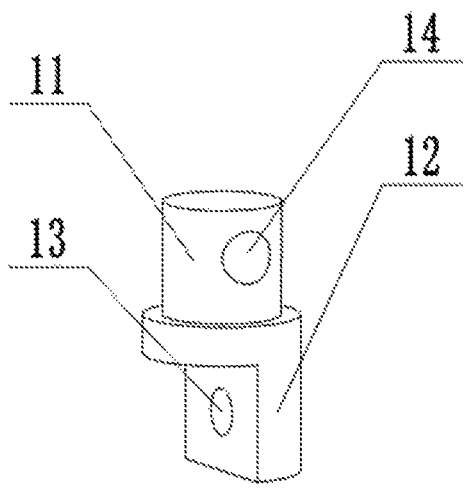
FIG. 5 is a schematic diagram of a first force transmitting portion according to the present invention.

As shown in FIG. 2 to FIG. 5: the present embodiment provides a tube pure shear loading device, including a to-be-tested tube, where the to-be-tested tube has a circular or non-circular cross section. In the present embodiment, the cross section of the to-be-tested tube is circular. The circular tube has an external diameter of 62 mm, a wall thickness of 1 mm, and a material of 5A02 aluminum alloy. The to-be-tested tube includes a first half tube 1, a whole tube 2 and a second half tube 3 connected in order, and the first half tube 1 and the second half tube 3 have the same size. A junction of the first half tube 1 and the whole tube 2 and a junction of the second half tube 3 and the whole tube 2 may further be provided with a slit, the slits having the same size, or not provided with a slit. The first half tube 1 is provided therein with a first mandrel 4, and the second half tube 3 is provided therein with a second mandrel 5. The first mandrel 4 and the second mandrel 5 have the same structure and size. A right plane or a left plane of the first half tube 1 is in the same plane as a left plane or a right plane of the second half tube 3, and is in the same plane as a tube axis of the whole tube 2. A cross section of the first half tube 1 and a cross section of the second half tube 3 are both equal to half a cross section of the whole tube 2. The cross section is a section perpendicular to the tube axis.

In the present embodiment, the first mandrel 4 includes a first connecting portion 6 and a first protruding portion 7 connected to each other. The first connecting portion 6 is provided thereon with a first through hole 8. The first through hole 8 is perpendicular to the right plane or the left plane of the first half tube 1. The first connecting portion 6 is disposed in the first half tube 1. The first through hole 8 is located above the first half tube 1. The first protruding portion 7 is engaged with the whole tube 2, for abutting against the first mandrel 4. When the first mandrel 4 moves upward, the first protruding portion 7 pushes a left side material of the whole tube 2 upward. The second mandrel 5 includes a second connecting portion and a second protruding portion connected to each other. The second connecting portion is provided thereon with a second through hole. The second through hole is perpendicular to the left plane or the right plane of the second half tube 3. The second connecting portion is disposed in the second half tube 3. The second through hole is located outside the second half tube 3. The second protruding portion is engaged with the whole tube 2, for abutting against the second mandrel 5. When the second mandrel moves downward, the second protruding portion pushes a right side material of the whole tube 2 downward. The first connecting portion 6 and the second connecting portion have the same sectional size. The sectional size of the first connecting portion 6 matches the section of the first half tube 1, and the sectional size of the second connecting portion matches the section of the second half tube 3, that is, the sectional shape of the first connecting portion 6 is the same as the sectional shape of the first half tube 1, and the sectional shape of the second connecting portion is the same as the sectional shape of the second half tube 3. In the present embodiment, the sectional size of the first connecting portion 6 and the second connecting portion is circular. The inside of the first connecting portion 6 and the second connecting portion may be hollow, that is, the section is a semi-circular ring, and a position in contact with an inner surface of the to-be-tested tube does not change. The first protruding portion 7 and the second protruding portion have the same sectional size larger than the size of the first half tube 1 and the second half tube 3. In the present embodiment, the size of the first connecting portion 6 and the second connecting portion is 60 mm, and the size of the first protruding portion 7 and the second protruding portion is larger than 62 mm, and in this implementation, the size of the first protruding portion 7 and the second protruding portion is 65 mm.

The present embodiment further provides a tube pure shear loading method. Before measurement, an outer surface of a pure shear area on a whole tube 2 is sprayed with a speckle or applied with a strain gage. A first mandrel 4 penetrates into a first half tube 1, and a second mandrel 5 penetrates into a second half tube 3. A first protruding portion 7 acts on the first half tube 1, and a second protruding portion acts on the second half tube 3. When a test is performed, a tensile head of a material testing machine is connected to the first mandrel 4 and the second mandrel 5 to apply a tensile force in opposite direction. During the test, strain can be measured in real time by an optical measurement method, namely digital image correlation (DIC), or by collecting data of the strain gage, to obtain a shear stress-shear strain curve of a to-be-tested tube, and the shear strength of an aluminum alloy material is 60 MPa by using the device and method of the present embodiment.

The present embodiment can further perform pure shear loading of the tube at a certain temperature, to measure the shear strength of the to-be-tested tube at a certain temperature.

In the present embodiment, by disposing the first mandrel 4 in the first half tube 1 and the second mandrel 5 in the second half tube 3, the to-be-tested tube can only move along an axial direction of the tube, and a contact surface of a first connecting portion 6 and the first half tube 1 and a contact surface of a second connecting portion and the second half tube 3 prevent the to-be-tested tube from being bent and twisted during a loading deformation, thereby balancing the to-be-tested tube to prevent instability. Forces are applied to the first mandrel 4 and the second mandrel 5 in opposite directions. A first protruding portion 7 of the first mandrel 4 transmits a force to the first half tube 1, and a second protruding portion of the second mandrel 5 transmits a force opposite to the force of the first mandrel 4 to the second half tube 3, that is, the forces applied to the first mandrel 4 and the second mandrel 5 are converted into a shear force, and the first half tube 1 and the second half tube 3 are subjected to the forces that are parallel and in opposite directions. A material of the whole tube 2 in the same plane as a right plane or a left plane of the first half tube 1 and a left plane or a right plane of the second half tube 3 is in a pure shear stress state till the whole tube 2 is finally fractured, and a shear characteristic of the material in the axial direction can be obtained.

In the present embodiment, the tube pure shear loading device and method proposed based on the principle of mechanical equilibrium are simple and feasible, and realize a pure shear test of the tube. The device and method of the present embodiment can not only obtain a pure shear deformation characteristic parameter of the material, but also use the parameter to define a numerical simulation material model.

The present embodiment has a simple structure, and the loading device designed according to the principle of mechanical equilibrium can make a test point of the test piece in a stable pure shear stress state, and can ensure that the pure shear stress state is stably maintained during the entire process from the initial yield of the test material to the complete shear fracture of the test piece, without the phenomenon of a tensile or compressive stress accompanying the deformation.

Embodiment 2

Figure 6:
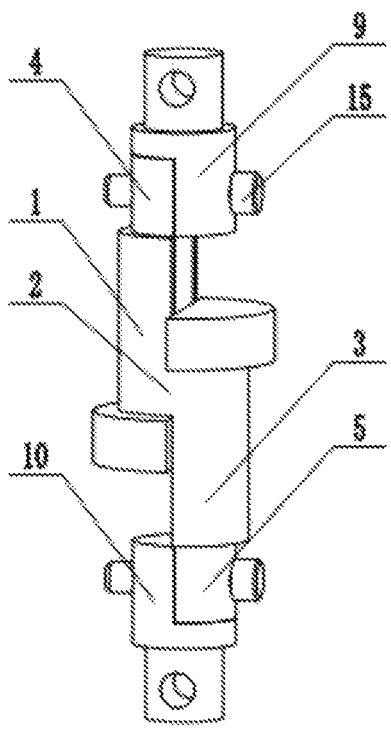
FIG. 6 is a second schematic diagram of a tube pure shear loading device according to the present invention.

As shown in FIG. 2 to FIG. 6, the present embodiment differs from Embodiment 1 in that: in the present embodiment, an upper end of a first mandrel 4 is connected to a first force transmitting portion 9, and the first force transmitting portion 9 includes a first loading portion 11 and a third connecting portion 12 connected to each other. The connecting portion 12 is provided thereon with a third through hole 13. The third through hole 13 and a first through hole 8 are fixedly connected by a positioning pin 15. The first loading portion 11 is provided thereon with a fourth through hole 14. The fourth through hole 14 is perpendicular to the first through hole 8, and the fourth through hole 14 is configured to connect a testing machine. The upper end of the first mandrel 4 is connected to a second force transmitting portion 10. The second force transmitting portion 10 includes a second loading portion and a fourth connecting portion connected to each other. The fourth connecting portion is provided thereon with a fifth through hole. The fifth through hole and the second through hole are fixedly connected by the positioning pin 15. The second loading portion is provided thereon with a sixth through hole. The sixth through hole is perpendicular to the second through hole, and the sixth through hole is configured to connect the testing machine. The sectional size of the first connecting portion 6 is the same as the sectional size of the third connecting portion 12, and the sectional size of the second connecting portion is the same as the sectional size of the fourth connecting portion.

The present embodiment further provides a tube pure shear loading method. Before measurement, an outer surface of a pure shear area on a whole tube 2 is sprayed with a speckle or applied with a strain gage. A first mandrel 4 penetrates into a first half tube 1, and a second mandrel 5 penetrates into a second half tube 3. The first mandrel 4 is connected to a first force transmitting portion 9, and the second mandrel 5 is connected to a second force transmitting portion 10. When a test is performed, a tensile head of a material testing machine is connected to the first force transmitting portion 9 and the second force transmitting portion 10 to apply a tensile force in opposite directions. During the test, strain is measured by an optical measurement method or by collecting data of the strain gage, to obtain a shear stress-shear strain curve of a to-be-tested tube. The present embodiment can further perform pure shear loading of the tube at a certain temperature, to measure the shear strength of the to-be-tested tube at a certain temperature.

In the present embodiment, by loading the first force transmitting portion 9 and the second force transmitting portion 10, a loaded force is transmitted through the first force transmitting portion 9 to the first mandrel 4, and then to the first half tube 1, and an opposite force is transmitted through the second force transmitting portion 10 to the second mandrel 5, and then to the second half tube 3, so that the first half tube 1 and the second half tube 3 are subjected to the forces that are parallel and in opposite directions, and a material of the whole tube 2 in the same plane as a right plane or a left plane of the first half tube 1 and a left plane or a right plane of the second half tube 3 is in a pure shear stress state till the to-be-tested tube is finally fractured, and a shear characteristic of the material in the axial direction can be obtained.

In the present embodiment, the tube pure shear loading device and method proposed based on the principle of mechanical equilibrium are simple and feasible, and realize a pure shear test of the tube. The device and method of the present embodiment can not only obtain a pure shear deformation characteristic parameter of the material, but also use the parameter to define a numerical simulation material model.

The present embodiment has a simple structure, and the loading device designed according to the principle of mechanical equilibrium can make a test point of the test piece in a stable pure shear stress state, and can ensure that the pure shear stress state is stably maintained during the entire process from the initial yield of the test material to the complete shear fracture of the test piece, without the phenomenon of a tensile or compressive stress accompanying the deformation.

Specific embodiments are applied in this specification to describe the principle and implementations of the present invention. The description of the aforementioned embodiments is only used for facilitating understanding of the method and the core idea of the present invention; and meanwhile, for those of ordinary skills in the art, there will be changes in specific implementations and application scope in accordance with the concept of the present invention. In conclusion, the content of this specification shall not be construed as a limitation to the present invention.

We claim:

1. A tube pure shear loading device, comprising a to-be-tested tube, wherein the to-be-tested tube comprises a first half tube, a whole tube and a second half tube connected in order; the first half tube is provided therein with a first mandrel, and the second half tube is provided therein with a second mandrel; a right plane or a left plane of the first half tube is in the same plane as a left plane or a right plane of the second half tube, and is in the same plane as a tube axis of the whole tube; a section of the first half tube perpendicular to the tube axis of the whole tube and a section of the second half tube perpendicular to the tube axis of the whole tube are both equal to half a section of the whole tube perpendicular to the tube axis of the whole tube.

2. The tube pure shear loading device according to claim 1, wherein the first mandrel comprises a first connecting portion and a first protruding portion connected to each other; the first connecting portion is provided there on with a first through hole; the first through hole is perpendicular to the right plane or the left plane of the first half tube; the first connecting portion is disposed in the first half tube; the first through hole is located outside the first half tube; the first protruding portion is engaged with the whole tube, for fixing the first mandrel;

the second mandrel comprises a second connecting portion and a second protruding portion connected to each other; the second connecting portion is provided thereon with a second through hole; the second through hole is perpendicular to the left plane or the right plane of the second half tube; the second connecting portion is disposed in the second half tube; the second through hole is located outside the second half tube; the second protruding portion is engaged with the whole tube, for fixing the second mandrel.

3. The tube pure shear loading device according to claim 2, wherein an upper end of the first mandrel is connected to a first force transmitting portion, and the first force transmitting portion comprises a first loading portion and a third connecting portion connected to each other; the third connecting portion is provided thereon with a third through hole; the third through hole and the first through hole are fixedly connected by a positioning pin; the first loading portion is provided thereon with a fourth through hole; the fourth through hole is configured to connect a testing machine;

the upper end of the first mandrel is connected to a second force transmitting portion; the second force transmitting portion comprises a second loading portion and a fourth connecting portion connected to each other; the fourth connecting portion is provided thereon with a fifth through hole; the fifth through hole and the second through hole are fixedly connected by the positioning pin; the second loading portion is provided thereon with a sixth through hole; the sixth through hole is configured to connect the testing machine.

4. The tube pure shear loading device according to claim 3, wherein the sectional size of the first connecting portion is the same as the sectional size of the third connecting portion, and the sectional size of the second connecting portion is the same as the sectional size of the fourth connecting portion.

5. A tube pure shear loading method, using the tube pure shear loading device according to claim 4 to measure the shear strength of a to-be-tested tube, and comprising: before measurement, spraying a speckle or applying a strain gage to an outer surface of a pure shear area on a whole tube, and penetrating a first mandrel into a first half tube, and a second mandrel into a second half tube; when a test is performed, connecting a tensile head of a material testing machine to the first mandrel or the second mandrel, or connecting the tensile head of the material testing machine to a first force transmitting portion and a second force transmitting portion, to apply a tensile force in opposite directions; and during the test, measuring strain by an optical measurement method in real time, or measuring the strain by collecting data of the strain gage, to obtain a shear stress shear strain curve of the to-be-tested tube.

6. The tube pure shear loading method according to claim 5, wherein during the test, pure shear loading of the tube is performed at a certain temperature, to measure the shear strength of the to-be-tested tube at a certain temperature.

7. A tube pure shear loading method, using the tube pure shear loading device according to claim 3 to measure the shear strength of a to-be-tested tube, and comprising: before measurement, spraying a speckle or applying a strain gage to an outer surface of a pure shear area on a whole tube, and penetrating a first mandrel into a first half tube, and a second mandrel into a second half tube; when a test is performed, connecting a tensile head of a material testing machine to the first mandrel or the second mandrel, or connecting the tensile head of the material testing machine to a first force transmitting portion and a second force transmitting portion, to apply a tensile force in opposite directions; and during the test, measuring strain by an optical measurement method in real time, or measuring the strain by collecting data of the strain gage, to obtain a shear stress shear strain curve of the to-be-tested tube.

8. The tube pure shear loading method according to claim 7, wherein during the test, pure shear loading of the tube is performed at a certain temperature, to measure the shear strength of the to-be-tested tube at a certain temperature.

9. The tube pure shear loading device according to claim 2, wherein the sectional size of the first connecting portion matches the section of the first half tube, and the sectional size of the second connecting portion matches the section of the second half tube.

10. A tube pure shear loading method, using the tube pure shear loading device according to claim 9 to measure the shear strength of a to-be-tested tube, and comprising: before measurement, spraying a speckle or applying a strain gage to an outer surface of a pure shear area on a whole tube, and penetrating a first mandrel into a first half tube, and a second mandrel into a second half tube; when a test is performed, connecting a tensile head of a material testing machine to the first mandrel or the second mandrel, or connecting the tensile head of the material testing machine to a first force transmitting portion and a second force transmitting portion, to apply a tensile force in opposite directions; and during the test, measuring strain by an optical measurement method in real time, or measuring the strain by collecting data of the strain gage, to obtain a shear stress shear strain curve of the to-be-tested tube.

11. The tube pure shear loading method according to claim 10, wherein during the test, pure shear loading of the tube is performed at a certain temperature, to measure the shear strength of the to-be-tested tube at a certain temperature.

12. A tube pure shear loading method, using the tube pure shear loading device according to claim 2 to measure the shear strength of a to-be-tested tube, and comprising: before measurement, spraying a speckle or applying a strain gage to an outer surface of a pure shear area on a whole tube, and penetrating a first mandrel into a first half tube, and a second mandrel into a second half tube; when a test is performed, connecting a tensile head of a material testing machine to the first mandrel or the second mandrel, or connecting the tensile head of the material testing machine to a first force transmitting portion and a second force transmitting portion, to apply a tensile force in opposite directions; and during the test, measuring strain by an optical measurement method in real time, or measuring the strain by collecting data of the strain gage, to obtain a shear stress shear strain curve of the to-be-tested tube.

13. The tube pure shear loading method according to claim 12, wherein during the test, pure shear loading of the tube is performed at a certain temperature, to measure the shear strength of the to-be-tested tube at a certain temperature.

14. The tube pure shear loading device according to claim 1, wherein a junction of the first half tube and the whole tube and a junction of the second half tube and the whole tube are both provided with a slit, and the slits have the same size.

15. A tube pure shear loading method, using the tube pure shear loading device according to claim 14 to measure the shear strength of a to-be-tested tube, and comprising: before measurement, spraying a speckle or applying a strain gage to an outer surface of a pure shear area on a whole tube, and penetrating a first mandrel into a first half tube, and a second mandrel into a second half tube; when a test is performed, connecting a tensile head of a material testing machine to the first mandrel or the second mandrel, or connecting the tensile head of the material testing machine to a first force transmitting portion and a second force transmitting portion, to apply a tensile force in opposite directions; and during the test, measuring strain by an optical measurement method in real time, or measuring the strain by collecting data of the strain gage, to obtain a shear stress shear strain curve of the to-be-tested tube.

16. The tube pure shear loading method according to claim 15, wherein during the test, pure shear loading of the tube is performed at a certain temperature, to measure the shear strength of the to-be-tested tube at a certain temperature.

17. The tube pure shear loading device according to claim 1, wherein a section of the to-be-tested tube perpendicular to the tube axis of the to-be-tested tube is circular, rectangular or special-shaped.

18. A tube pure shear loading method, using the tube pure shear loading device according to claim 17 to measure the shear strength of a to-be-tested tube, and comprising: before measurement, spraying a speckle or applying a strain gage to an outer surface of a pure shear area on a whole tube, and penetrating a first mandrel into a first half tube, and a second mandrel into a second half tube; when a test is performed, connecting a tensile head of a material testing machine to the first mandrel or the second mandrel, or connecting the tensile head of the material testing machine to a first force transmitting portion and a second force transmitting portion, to apply a tensile force in opposite directions; and during the test, measuring strain by an optical measurement method in real time, or measuring the strain by collecting data of the strain gage, to obtain a shear stress shear strain curve of the to-be-tested tube.

19. A tube pure shear loading method, using the tube pure shear loading device according to claim 1 to measure the shear strength of a to-be-tested tube, and comprising: before measurement, spraying a speckle or applying a strain gage to an outer surface of a pure shear area on a whole tube, and penetrating a first mandrel into a first half tube, and a second mandrel into a second half tube; when a test is performed, connecting a tensile head of a material testing machine to the first mandrel or the second mandrel, or connecting the tensile head of the material testing machine to a first force transmitting portion and a second force transmitting portion, to apply a tensile force in opposite directions; and during the test, measuring strain by an optical measurement method in real time, or measuring the strain by collecting data of the strain gage, to obtain a shear stress shear strain curve of the to-be-tested tube.

20. The tube pure shear loading method according to claim 19, wherein during the test, pure shear loading of the tube is performed at a certain temperature, to measure the shear strength of to-be-tested tested tube at a certain temperature.

* * * * *